June 14, 1960  L. PERRAULT  2,940,119
PIPE EJECTOR-PULL OUT
Filed Jan. 15, 1954  3 Sheets-Sheet 1

INVENTOR
Lewis Perrault

BY Cushman, Darby & Cushman
ATTORNEYS

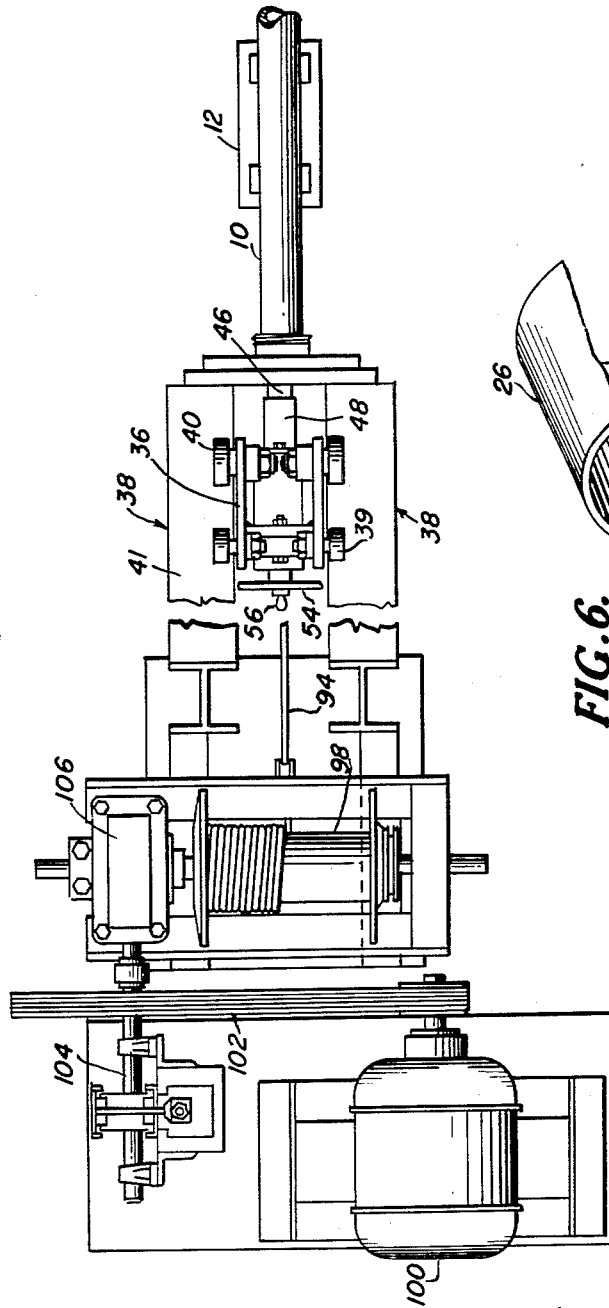
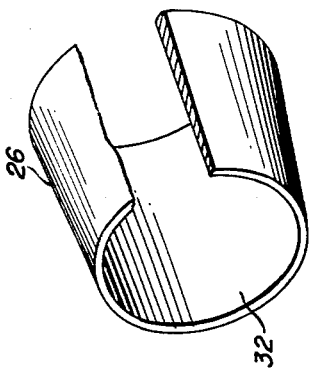

June 14, 1960  L. PERRAULT  2,940,119
PIPE EJECTOR-PULL OUT
Filed Jan. 15, 1954  3 Sheets-Sheet 3
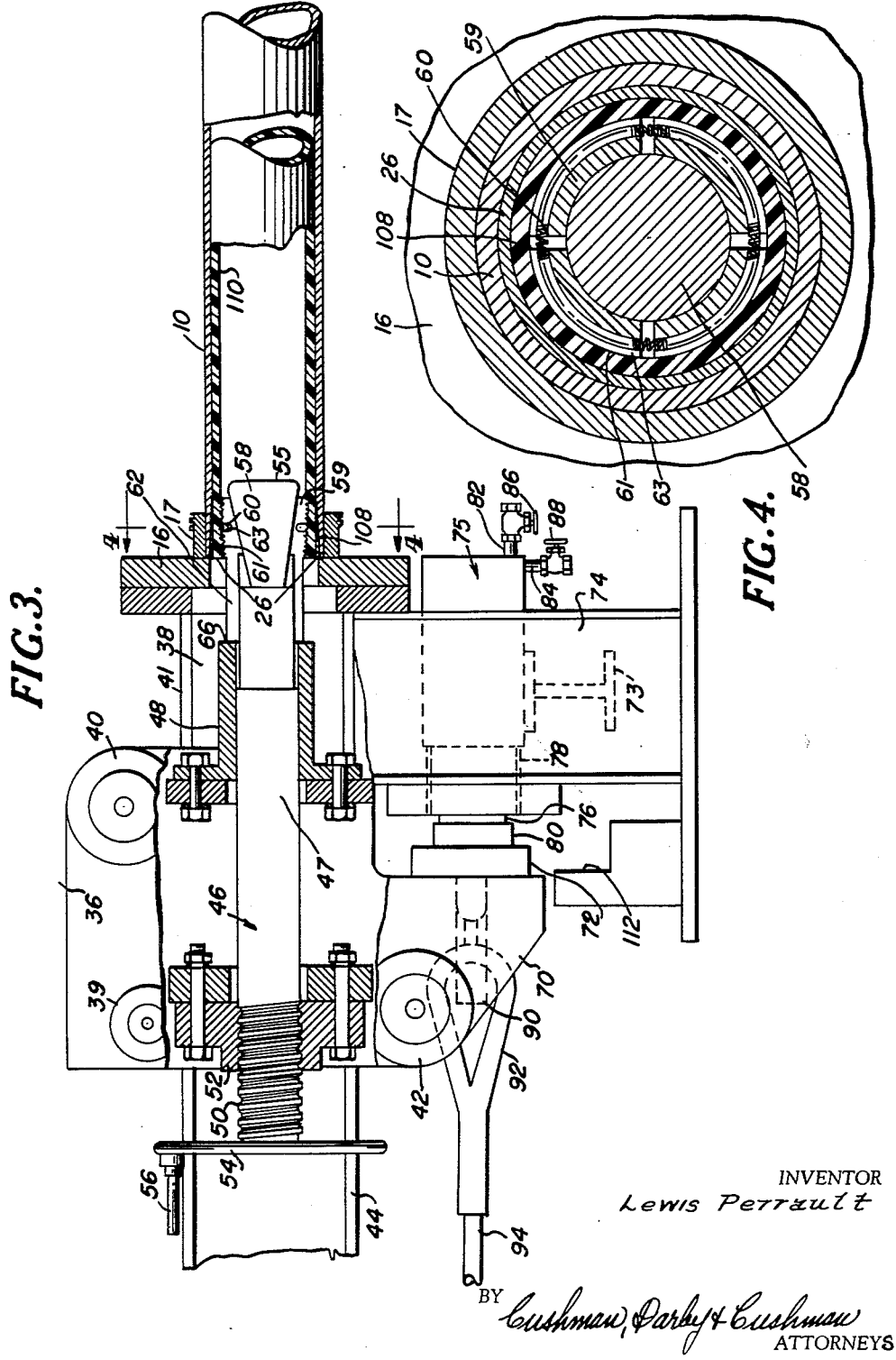
INVENTOR
Lewis Perrault
BY Cushman, Darby & Cushman
ATTORNEYS 2,940,119
Patented June 14, 1960

2,940,119

PIPE EJECTOR-PULL OUT

Lewis Perrault, Tulsa, Okla., assignor to H. D. Boggs Company, Ltd., Omaha, Nebr., a limited partnership Filed Jan. 15, 1954, Ser. No. 404,329

3 Claims. (Cl. 18—2)

This invention relates to a pipe ejector for withdrawing pipe and similar articles from molds in which the article has been cast.

As an example of the invention it is well known that that a thermosetting plastic material may be effectively cast into piping by introducing the plastic material in liquid form, preferably with reinforced fibers, into a mold in centrifugal cylindrical pipe casting apparatus and effecting a cure of the material as the mold is spun about its longitudinal axis. While the pipe so formed is removable from the mold, there is, nevertheless, a fairly tight fit. Previous techniques for pipe removal have relied upon pushing the pipe from the molds, but this tends to swell the pipe and fit it more firmly in the mold.

It is an object of this invention to provide a new and improved means for removing such cast piping and similar articles from a mold.

It is a further object of this invention to provide separate but cooperating means to first break the grip between the casting and the mold and then to withdraw the casting from the mold.

These and other objects of my invention will be fully understood from the following detailed description of a typical preferred form and application of the invention, and the appended claims.

The invention may be best understood with reference to the accompanying drawings, in which:

Figure 2 is a top plan view of the pipe ejecting apparatus with a mold located adjacent therewith in operative position;

Figure 3 is a partial side elevational view with portions cut away to better illustrate the operation thereof;

Figure 4 is a sectional view taken along the lines 4—4 of Figure 3; and,

Figure 6 shows an ejector ring according to the invention.

Figure 1:
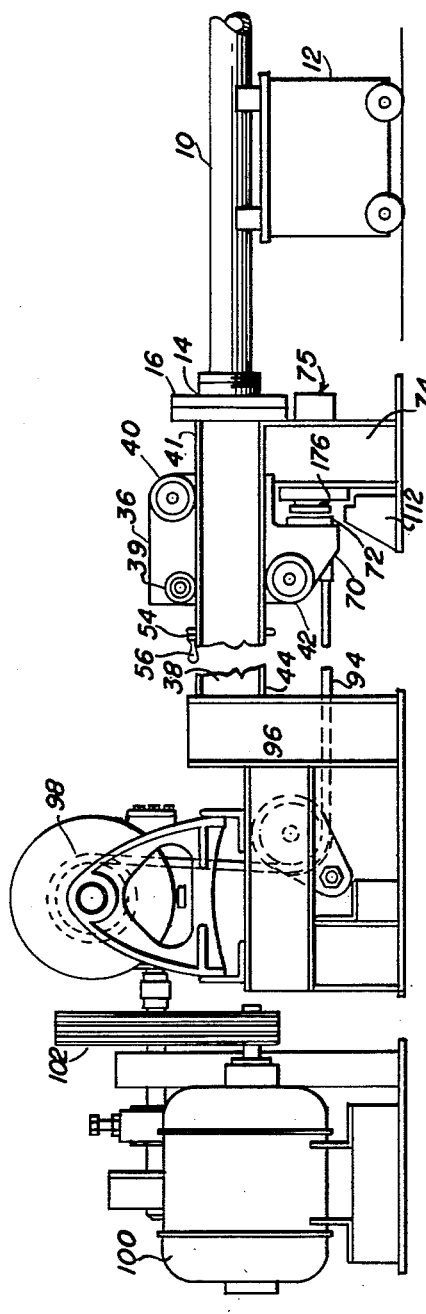
Figure 1 is a side elevational view of the pipe ejecting apparatus with a mold located adjacent therewith in operative position.

Referring to Figure 1, a mold 10, carried upon dolly 12, is placed adjacent to the pipe ejector with the mouth 14 of the mold abutting face plate 16.

Figure 5:
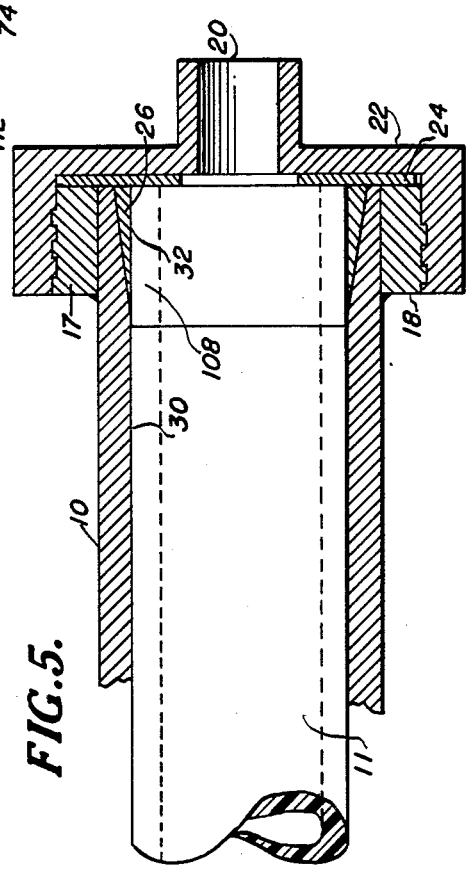
Figure 5 is a partial side elevational view, in section, of a mold enclosing a cylindrical cast section of piping and an ejector ring.

As shown in Figure 5, the mold 10 is provided with a collar 17 threaded at 18 to centrally apertured 20 cap 22. This closure is sealed by gasket 24. The mouth of the mold has a tapered counterbore which receives the reinforcing ring 26. This ring has its outer periphery tapered inwardly from the mouth of the mold to provide a loose complementary fit with the counterbore. The interior periphery 32 of the ring has a diameter equal to the bore 30 of the mold and forms a continuation thereof.

The pipe ejector is provided with a carriage 36 straddling rails or ways formed by parallel, horizontally disposed I-beams 38. As shown in Figures 1 and 2, the upper carriage wheels 39 and 40 are in rolling contact with the upper flange 41 of the I-beam and the lower wheels 42 are in rolling contact with the lower flange 44, so that the carriage is securely held between the beams while being allowed to move along them.

As shown in Figures 2 and 3, the carriage carries operating rod 46 with its smooth portion 47 slidably mounted in sleeve 48 and with its threaded portion 50 engaged with nut-sleeve 52. The operating rod is provided at one end with an operating wheel 54, having handle 56. The other end is reduced and formed with a truncated conical wedge portion 58 flaring outwardly towards its free end 55.

The conical wedge portion 58 is provided with a segmental collar ring composed of four chordal elements 59 joined by tension spring member 60 disposed in a peripherial groove 63. The segmental ring is formed with an interior taper complementary with that of conical end portion 58. The segmental ring has an exterior peripheral surface parallel with the interior of the pipe mold. As shown in Figure 3, the peripheral or exterior surface portions of each chordal element 59 are provided with fine serrations 61. The segmental elements are provided with axially extending portions 62 which are adapted to abut the edge 66 of sleeve 48 radially of the operating rod 46 and without contacting it. When the mold is located in the operative position for ejecting the casting, the collar 17 abuts shoulder 16 fixed to the ends of I-beams 38.

The carriage 36 is provided with a depending shoulder portion 70 carrying abutment face 72. Stanchions 74 together with I-beam 73 provide a support for a horizontal hydraulic jack 75, comprising a piston 76 and cylinder 78 disposed beneath the I-beams 38. The piston is provided with a cylindrical face plate 80 disposed coaxially and in registry with the abutment face 72. The cylinder 78 is provided with a suitable pressure supply 82 and relief 84 lines controlled by valves 86 and 88 respectively.

The depending shoulder portion 70 also carries a suitable snap ring 90 adapted to secure eye 92 to the body of the carriage. As best shown in Figures 1 and 2, cable 94 extends from eye 92 around pulley 96 to the winch drum 98.

The winch may be powered by any appropriate means, but it is here illustrated as operatively engaged to electric motor 100 through V-belts 102 driving a pulley fixed on shaft 104. This motor may be energized through any convenient switch (not shown). As shown in Figure 2, the shaft operates the winch drum through a reduction gearing means, indicated generally as 106.

Inasmuch as the jack 75 and cable 94 both act on depending shoulder portion 70, the carriage wheels 40 and 42 are selected from heavy duty stock to absorb the torque reaction of the carriage. The leading wheels 39 may be fashioned of lighter material as they merely absorb the pulling load of their share of the carriage weight.

In the operation of this invention, the cast article, for example, a length of thermosetting plastic pipe 110, is cast with one end 108 within the reinforcement ring 26, as shown in Figure 5. When the casting has cooled and hardened, the cap 22 may be removed, and the mold 10 is conveyed by the dolly 12, or by other suitable means, to a position shown in Figures 1, 2 and 3, with the collar 17 abutting shoulder 16, and with the mold in axial alignment with the operating rod 46. As the mold and casting are brought into operative position, the carriage 36 is disposed at the extreme ends of the I-beams with the operating rod 46 extended by rotational manipulation of operating wheel 54. The extended position of the conical wedge portion 58 allows the segmental collar ring to be slid inwardly along its tapered surface until the external diameter of the circle defined by the chordal elements 59 is less than the internal diameter of reinforcing ring 26.

After the mold has been secured in its proper position, the operating wheel 54 is manipulated in a reverse direction to withdraw the conical portion 58. This action brings segmental element extensions 62 against edge 66 of the sleeve 48, and further rotation of the operating wheel will result in a forcible radial expansion of the serrated faces 61 of the chordal elements 59. The wedging action of the segmental ring against the end portions 108 of the piping 110 and the confining reinforcing ring 26 will securely engage the operating rod and carriage with the cast pipe 110.

The opening of valve 86 will supply a pressurized hydraulic fluid to the cylinder 78 and will immediately extend piston 76. The movement of the hydraulic jack is limited to a few inches by stop means, here illustrated as abutment 112. Usually, as in the case of thermoset glass-reinforced pipe, there is no chemical bond between the pipe and mold. Nevertheless, there is an intimate fit or grip creating an initial adhesion between the casting and the mold which is broken by the powerful, but limited, movement of the jack. After this initial grip is broken, the carriage 36, operating rod 46, and cast pipe 110 are pulled away from the mold by cable 94 engaged with winch 98 operated by electric motor 100.

The hydraulic jack and winch may be either sequentially operated, or operated together to create a combined withdrawing force which is applied to the wedge 58, pipe end 108, and reinforcing ring 26. The ring remains in the same relative position on the pipe 110 as the pipe moves out from the mold 10.

It will be understood that the I-beams 38 may be selected of a length commensurate with the lengths of piping to be handled, and that suitable slings or dollies may be used to carry away the piping after it has been completely withdrawn from the mold.

Having described only a typical preferred form and application of the invention, it is not to be limited or restricted to specific details herein set forth, but wish to reserve to myself any variations or modifications that may appear to those skilled in the art and falling within the scope of the following claims.

I claim:

1. Apparatus for withdrawing a new and partially cured tubular plastic casting from a tight-fitting cylindrical mold comprising: a reinforcing ring so fitted within a counterbore at one end of the mold whereby the ring is free to be withdrawn therefrom, the internal periphery of said ring being cylindrical and the arrangement being such that the internal periphery of the reinforcing ring serves as a portion of the casting mold during the casting operation and is occupied by a portion of the cast tubular article at the end of the casting operation; expanding gripping means having a relaxed diameter somewhat smaller than the diameter of the internal periphery of the portion of the casting mold constituted by said reinforcing ring, and having a maximum expanded diameter at least substantially equal to the last mentioned diameter; means for conveying said gripping means into the casting mold to a position circumscribed by said reinforcing ring; means for selectively expanding said gripping means against the internal periphery of that portion of the casting circumscribed by the reinforcing ring to wedge the same against the internal periphery of the ring; and selectively operable means for moving the said expanding means, said pipe and said reinforcing ring out of and away from said mold.

2. Apparatus for withdrawing a new and partially cured tubular plastic casting from a tight-fitting cylindrical mold comprising: a reinforcing ring so fitted within a counterbore at one end of the mold whereby the ring is free to be withdrawn therefrom, the internal periphery of said ring being cylindrical and the arrangement being such that the internal periphery of the reinforcing ring serves as a portion of the casting mold during the casting operation and is occupied by a portion of the cast tubular article at the end of the casting operation; expanding gripping means having a relaxed diameter somewhat smaller than the diameter of the internal periphery of the portion of the casting mold constituted by said reinforcing ring, and having a maximum expanded diameter at least substantially equal to the last mentioned diameter; means for conveying said gripping means into the casting mold to a position circumscribed by said reinforcing ring; means for selectively expanding said gripping means against the internal periphery of that portion of the casting circumscribed by the reinforcing ring to wedge the same against the internal periphery of the ring; hydraulic jack means for exerting a relatively large force through a relatively short distance to urge the expanded gripping means, together with the casting and the reinforcing ring gripped thereby, a short distance, relative to the length of the mold, axially of the mold and towards the nearest mouth thereof, to break the initial adhesive bond between the casting and the mold; winch means to engage said gripping means to pull the gripping means, and the casting and reinforcing ring gripped thereby, in the same direction as the movement imparted by the hydraulic jack through a distance sufficient to withdraw the entire casting from the mold.

3. Apparatus for withdrawing a partially cured plastic casting from a tight-fitting cylindrical mold comprising a reinforcement ring having a tapered external periphery and a cylindrical internal periphery, the interior diameter of said ring being substantially equal to the interior diameter of the major porton of the mold, said reinforcing ring being disposed within a recess in the mold at one end thereof, and expanding gripping means disposed within that portion of the casting circumscribed by said reinforcing ring and selectively operable to wedge the end of the casting against the internal periphery of said ring, said expanding gripping means being fixed to a carriage disposed for movement longitudinally of the mold and away therefrom, hydraulic jack means disposed to abut said carriage means and to drive it away from the mold, winch means engaged with said carriage means to pull said carriage means away from the mold, said jack means and said winch means being arranged to simultaneously urge said carriage away from the mold.

References Cited in the file of this patent

UNITED STATES PATENTS

| 518,583 | Brien et al. | Apr. 24, 1894 |
| 1,344,409 | Ladd | June 22, 1920 |
| 1,723,792 | Ladd | Aug. 6, 1929 |
| 1,726,672 | Ladd | Sept. 3, 1929 |
| 1,758,883 | Camerota | May 13, 1930 |
| 1,960,366 | Barr et al. | May 29, 1934 |
| 2,630,600 | Boggs | Mar. 10, 1953 |

FOREIGN PATENTS

| 504,420 | Germany | Aug. 12, 1930 |
| 426,172 | Great Britain | Mar. 28, 1935 |